United States Patent
Mokhnatkina

(10) Patent No.: US 11,255,682 B2
(45) Date of Patent: Feb. 22, 2022

(54) METHOD FOR DYNAMIC CREATION OF CUSTOMIZED TOUR GUIDES

(71) Applicant: Maria Mokhnatkina, San Jose, CA (US)

(72) Inventor: Maria Mokhnatkina, San Jose, CA (US)

( * ) Notice: Subject to any disclaimer, the term of this patent is extended or adjusted under 35 U.S.C. 154(b) by 122 days.

(21) Appl. No.: 16/599,668

(22) Filed: Oct. 11, 2019

(65) Prior Publication Data

US 2020/0041289 A1    Feb. 6, 2020

Related U.S. Application Data

(63) Continuation-in-part of application No. 15/607,408, filed on May 26, 2017, now abandoned.

(60) Provisional application No. 62/343,079, filed on May 30, 2016.

(51) Int. Cl.
*G01C 21/34* (2006.01)
*G06Q 50/14* (2012.01)

(52) U.S. Cl.
CPC ....... *G01C 21/343* (2013.01); *G01C 21/3476* (2013.01); *G06Q 50/14* (2013.01)

(58) Field of Classification Search
CPC . H04W 4/02; G01C 21/3484; G01C 21/3682; G01C 21/343; G09B 5/125; G06Q 50/14
See application file for complete search history.

(56) References Cited

U.S. PATENT DOCUMENTS

2013/0080056 A1\* 3/2013 Homma ............. G01C 21/3476
701/537
2016/0301808 A1\* 10/2016 Choi ................. H04M 1/72469

\* cited by examiner

*Primary Examiner* — Rami Khatib
(74) *Attorney, Agent, or Firm* — Nadya Reingand; Yan Hankin

(57) ABSTRACT

The invention is a method and system of creating and delivering dynamic and customized tour guides to a user through an electronic device. The system takes into account factors including the speed, direction of movement, and geographical location of a user's electronic device along with a user's preferences, and calculating a timeframe in which a user will be in proximity to a point of interest to create and deliver a customized and tailored tour guide experience. The system and method is scalable and allows a multitude of individual users simultaneously have individually tailored tour guides delivered to them covering a broad range of topics including architecture, history, surrounding nature, and current events of points of interest along a user's pre-defined or predicted user route.

18 Claims, 4 Drawing Sheets

METHOD FOR DYNAMIC CREATION OF CUSTOMIZED TOUR GUIDES

CROSS-REFERENCE TO RELATED APPLICATIONS

The present patent application claims priority to U.S. patent application Ser. No. 15/607,408 filed on May 26, 2017, which claims priority to U.S. Provisional Patent Application Ser. No. 62/343,079, filed May 30, 2016.

FIELD OF THE INVENTION

The present invention relates to the field of tour guides. More particularly to the field of dynamically created tour guides that are customized to the route of the tour guide's user.

BACKGROUND ART

Currently available Travel Guides (trip, tour, museum) are pre-created static materials in the text, image, audio or video forms, which provide the information to the end user without taking into account the situation, state, user preferences and needs. The Guides usually are delivered via printed mediums (books, booklets, magazines), electronic mediums (CD, DVD, MPx formats), or personal computing devices (computers, laptops, smart devices, wearables) in a shape of applications or computer programs. The most advanced travel guides take ready manually prepared information material, make the user follow certain instructions (for example, follow geographical route), and trigger the material delivery based on the user location on this route. This is very limited, because:
a) User cannot receive the guide wherever they go (route on the road, museum, trail) they have to follow certain pre-defined route with the predefined speed to get the guide.
b) The big cities, museums, popular tourist destinations are somewhat covered with the rigid static guides, but majority of the routes (especially via road travel) are completely uncovered.
c) User will receive the same guide information following the same route again no new content will be served.
d) No user and situational context is taken into account, despite the difference in the user preferences, schedule, experience, needs, the guide will stay the same.

Because of this limitation, nonhuman guiding experience in travel is fragmented and non-satisfactory for the end users.

The invention addresses the gap and provide dynamic flexible runtime guides with the 100% of route coverage wherever the user goes, taking into account user needs, preferences and schedule, and serving new, relevant data every time of use.

SUMMARY OF THE INVENTION

A method of creation and delivering the travel guide comprises of the following steps: a) Information gathering: data about objects to be covered in the guide is either manually loaded, obtained from the 3rd systems, crawled on the Internet, or crowdsourced; b) Information processing: gathered objects data is processed, sorted, unified and formatted in a way to be used in the guide, and stored (optionally); c) Figuring out the needs of the client: client requirements are obtained either by explicit user input, and/or by implicit learning about Client historical behavior and preferences, and learnings on the clustered client groups; d) Guide creation: based on the requesting client requirements, the guide is machine created from the processed information; e) Guide serving: guide is delivered to the client (in requested format audio, video, text) per client request and situation context.

The travel guide is created automatically based on any location of a user, any user's travel destination(s) and any user travel route, i.e., regardless, from where or to where, the user goes they would receive the unique travel guide. Current travel guide solutions, either software/hardware based, or paper, are able to deliver travel guides for specific locations and routes only, thus their coverage is limited. This invention provides a solution which is dynamic and covers the entire Earth. Also, the guide is customizable for user needs and travel plans.

BRIEF DESCRIPTION OF THE DRAWINGS

The present invention will now be discussed in further detail below with reference to the accompanying figures in which.

DETAILED DESCRIPTION OF THE PREFERRED EMBODIMENTS

Terminology

Figure 1:
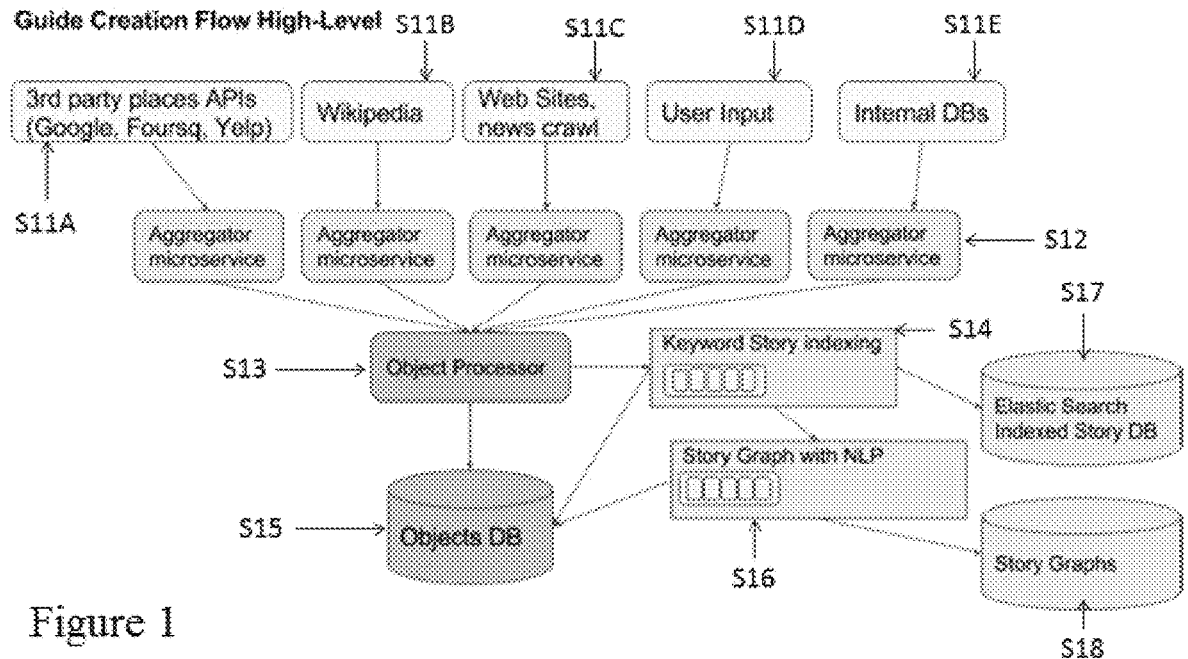
FIG. 1 is a high level view of guide creation according to the present invention.

"Passing (by)," as used herein with reference to the user passing (by) a place of interest (POI), is defined as a calculated position by the present invention of the user, the calculated position of the user being relative to the center of the POI, the calculated position equating to when the difference between the coordinates of a user device location and the coordinates of the POI location, on the map, is zero) the corresponding point of interest. If the user's device does not pass the center of the POI, the present invention takes the lowest value obtained to infer that the user has passed the central point of the POI and therefore is moving, or at least beginning to move, away from the POI. Such a determination may be made, e.g., via any graphical software which begins to show a trough-like graph. It is noted that, in addition to the information disclosed herein, several currently known methods exist for such geometrical determinations. The range of the user to the center of a point of interest is determined using the following factor: The guide should begin talking about the POI before the POI is approached, and the guide finishes right after (or some time after after) the user passes the lowest value obtained to infer that the user has passed the central point of the POI.

Therefore, passing (by) can also mean that the user is a distance from the central point of the POI, and therefore "passing (by)" does not necessarily require an exact moment in time. In such cases, the issue is how to determine the starting point and ending point of "passing (by)". This is performed by taking into account the following factors: (1) the speed of the user; (2) an estimated distance to the lowest value obtained between user and center of POI; 3) the duration of the POI description in time (e.g., there can be story alternatives talking about the same POI); (4) the locations of other POIs, depending on how far the user is from the other POIs (if the user is nearby another POI, additional descriptions of those POIs can be added if time permits. Selecting the story alternative (based on another POI nearby) is performed via a formula based on the user's estimated duration of travel between POI1 and POI2. The POI story duration also takes into account user preferences that impact the customization of the guide). If the minimum of a target POI story's duration (story alternative with minimum duration) is greater than or equal to the user's estimated duration of travel between POI1 and POI2, then one of the other POI's stories may be skipped (as both wont fit the time constraints). If the maximum of a target POI story duration (story alternative with maximum duration) is less than or equal to the user's estimated duration of travel between POI1 and POI2, then the guide may select additional POIs to describe in order to fill in the silence. It is also noted that a POI itself may be not a point, but an area—for example, if a user enters a new country, or is exploring a national park, the guide may present a story about the area, not just a specific point in it. In this case, the story may be given as soon as a user enters the area's border, thus any moment within the area (for example, when the user is walking through an area where POIs having central points are located far from each other, the guide may fill in the silence with general descriptions of the area.

POI: Point Of Interest certain object (landmark, restaurant, hotel, vista, etc) on the map (and earth) which could be interesting for user to visit/observe.

Route: Instructions/description on the way for the user to reach from location A to location B.

User: An individual smartphone user with location data.

Customer: Business owner whose POI/business is promoted via the system with coupons and/or tickets.

GPS: Global Positions System is the connection to the smartphone.

GPS Integration: Is the method of connecting GPS data to specific smartphone operating systems.

Photos/Video: Is the feature on smartphones that allows users to take and upload photos.

Social Media Credentials: The credentials users used to login to other social media sites, such as Facebook, Twitter, LinkedIn, etc. These credentials usually are user names and passwords.

Social Media Promotion: A nonconventional promotion channel via social media sites with the viral effects.

Text Messages: Is the feature allowing mobile phones to receive short messages SMS or text messages via a wireless network.

Deal Record: A record in the system's cloud Database storing information about certain promoted deal (discount coupons).

Ticket Record: A record in the system's cloud Database storing information about certain promoted tickets to visit certain attraction POI.

OATH2: secure protocol between clients and servers for user login.

Frequent Roadtripper: A person travelling by car at least once per month or often for the distances 75+ miles.

The main concept of this innovation is that, instead of being static and predefined, Guide is dynamically created from the bulk of available information (online databases, internet, web application apis, online books, press (magazines), web sites, crowdsourced user uploaded information, video and audio data) based on the current use case context, and then served dynamically as well depending on the user needs, user behavior, preferences, environmental state and situational context. The guide of the present invention is able to cover all locations on Earth, rather than a selective few locations (i.e., the guide scales, while the prior art cannot))
For example:

Patty, who likes art, wine and sea shore, travels from San Francisco to Santa Barbara, and follows the Rt 1 road. Leaves at 9 am on Saturday. Taking this data as an input, the system implementing the subject Method would:

i) Take Patty's travel route, find the Places of Interest (POIs) and Geographical Objects (GO) along the route using the electronic Maps (proprietary or 3rd party, like Google Maps, Yelp, etc);

ii) Gather the information about the POIs and GOs crawling the databases, internet, websites (POIs sites, news, online magazines) online web applications (like Wikipedia, foursquare, etc);

iii) Process the information using Natural Language Processing methods for the relevance, quality and context correlation;

iv) Create the Guide graph with the portions of processed data and machine generated content structured and connected into a shape of the story blocks;

v) Construct the Guide runtime from the processed information story blocks taking into account Patty's preferences (that she likes art, wine and sea shore), Patty's schedule (when she leaves, expected time when she would be at certain locations), Patty historical behaviors (when she likes to have a lunch, how long she drives without stops usually, what else she like to discover on the route), and inputs from the other similar users behaviors (user who likes wine stopped at this winery);

vi) Serve the guide to Patty on the go dynamically adjusting to her moving speed, route changes, stops and requests (like: Patty moves with the speed 60 mph, at the city A along her route there are 5 interesting places wineries and art galleries to tell about, but as she moves by quickly there is enough time to tell only about 2, most priorital. If Patty slows down to 30 mph moving through the town, the stories of all 5 POIs will be told. If Patty changes the route, new data for the guide is loaded and served and also the sequence of the story is changed. If Patty asks "what is this landmark on the right", guide searches the information about the place by the name and location, reconstructs the whole story and tells Patty about the landmark).

Guide Content Data Preprocessing

1. Object/POI data correlation: as data is gathered from the different sources, it contains multiple information pieces which might be related to the same POI/object. So the system performs identification of the objects and matching (correlation) of the information pieces. POI/object geographic location, name, description, attributes are used to do the matching. Matching rules can be as strict (exact match), so weak locations within certain distance, some keywords are matching, some attributes, similar phrases in the description. Level of correlation (strict or weak) is flexible and defined by particular use case requirements.

2. Object/POI data cleanup and sorting: once all the data is identified and correlated with particular object/POIs, data cleanup is performed: a. data, which didn't find the object/POI to belong to, is removed; b. duplicate information is consolidated; c. low quality data (like fragmented pieces) is deleted.

Guide Element "Story" Creation Story Graph

For each object to be included into the Guide (POI, fact, etc) the Story Graph is created, based on the obtained data from the multiple sources. Story Graph structured as the Nodes, connected together into the graph, with single or multiple paths between nodes, and when any path is followed, the connected story about the object can be retrieved. i.e. pieces of text information, and/or audio/video information connected together in a such way, that following the connections from start to any end of the graph, the user can read/hear/see logically and semantically connected story.

1. Nodes: logically and semantically complete text, audio, video pieces of the information.
  1.1. Two types of nodes:
    1.1.1. Story node: Content for the node extracted from the obtained data about the object (POI, fact, etc). Object data is structurally analysed, broke down into the parts, attributed with the semantic keywords, priorities, etc. Nodes could be text, audio and/or video.
    1.1.2. Service node: Content for the node is generated for the service purpose: connect the story nodes together, give a user the story preview, etc, create nice start/ending of the story. For example "Now let me tell you about the sports events in the city".
  1.2. How the node content is created for the Story Node:
    1.2.1. Text Content:
      1.2.1.1. Text is parsed for the paragraph, sentences, headers extracted.
      1.2.1.2. Using Natural Language processing algorithms based on the keyword and text patterns extraction and their correlation, high level meaning of the piece is detected, and corresponding attribute is attached to the piece. For example, for the piece "The city was founded in 1845 by the state governor" the method detects the pattern "was founded, <year>", attributes the piece with the tags "generic, history". These tags are used to correlate the pieces of the text and structure them in the right way.
      1.2.1.3. Identified pieces are stored as a Nodes attributed with the tags of original source, predecessor and successor Node IDs (if the Node is extracted from the text), semantic tags (what topic the node relates to, what it talks about), node length (duration when converted into the audio piece), priorities, etc.
    1.2.2. Audio content:
      1.2.2.1. Audio title and attributes are analysed and high level audio relevance is detected (based on the keywords and text patterns).
      1.2.2.2. Audio content is converted from speech to text using the speech recognition engine, and the resulted text is recorded. The text then parsed using Natural Language processing techniques to identify keywords and text patterns, and then, based on the analysis results, audio piece is attributed with the corresponding semantic keywords.
    1.2.3. Video content:
      1.2.3.1. Video title and attributes are analysed and high level audio relevance is detected (based on the keywords and text patterns).
      1.2.3.2. Audio row is extracted and content is converted from speech to text using the speech recognition engine, and the resulted text is recorded. The text then parsed using Natural Language processing techniques to identify keywords and text patterns, and then, based on the analysis results, audio piece is attributed with the corresponding semantic keywords.
    1.2.4. Inappropriate/irrelevant content:
      1.2.4.1. During the parsing & analysis process the content is checked to see if it is appropriate/relevant.
        1.2.4.1.1. Inappropriate words, phrases identified (bad, etc.).
        1.2.4.1.2. Irrelevant content identified for example, we expect museum with this name, and based on the keyword analysis, we see "shop", "shopping mall", "apparel".
      1.2.4.2. Inappropriate/irrelevant content is cleaned up.
2. Story Graph: the Nodes, connected together in a way representing the order, sequence, priority of the individual pieces of information for the guide execution.
  2.1. The graph vertices reference the Nodes.
  2.2. The graph edges show how Nodes should be connected with each other in the story, and also carry the attributes of the graph transitions:
    2.2.1. Priority of the transition;
    2.2.2. Duration of the piece ahead;
    2.2.3. Semantic key attributes of the branch (about what the branch would be telling, like "history, sport");
    2.2.4. Number of the nodes ahead;
    2.2.5. Etc.
  2.3. The Nodes in the graph are connected in the way, that each path from the head to any node represent the connected semantically complete story.
  2.4. To construct the graph, the following factors are taken into account:
    2.4.1. Original order of the Nodes extracted from the source (like what piece of text goes after another).
    2.4.2. Attributes of the nodes, with the focus of the Node topic (what it talks about) and duration, and also the nodes priorities (more factors can be accounted for).
  2.5. Once the graph structure is identified in terms of the order and connections of the Story Nodes, Service Nodes are generated and inserted to smoothly connect the pieces of the information with each other:
    2.5.1. Including announcing header/topic of the next story node;
    2.5.2. Announcing start, continuation, end of the story;
    2.5.3. Extracting, summarizing upcoming information of the next story node(s) and condensing it in a shorter concise node (for the purpose of the duration reduction for the shorter guides, mostly, so the long path can be altered with the shorter node when there is no time).

Guide Creation from the Story Graphs

The overall guide structure is the following: Individual guide elements nodes, connected together into the guide graph:

1. Guide Graph Nodes: elements, which reference/contain the Story Graphs of individual unique objects:
  1.1. Story Graphs of Obtained content: POIs, facts, service data, etc information comprising the representation of the objects included into the guide.
  1.2. Service Guide Nodes: created or generated content which purpose is to connect the data from the individual Story Graphs nodes into the smooth relevant story: for example: "We finished the story of Santa Barbara downtown. Next, will talk about Santa Barbara beaches, starting from Butterfly beach".
2. Guide Graph: the Guide Graph Nodes, connected together in a way representing the order, sequence, priority of the Guide Graph Nodes for the guide execution.
  2.1. The graph vertices reference the Guide Graph Nodes (individual Story Graphs and/or Service Guide Nodes).

2.2. The graph edges show how Guide Graph Nodes should be connected with each other in the story, and also carry the attributes of the graph transitions:

2.2.1. Priority of the transition;

2.2.2. Duration of the piece ahead in time;

2.2.3. Semantic key attributes of the branch (about what the branch would be telling, like "history, sport");

2.2.4. Number of the nodes ahead;

2.2.5. The type of the node ahead Story Graph, another Guide Graph, or Service Guide Node.

3. To summarize, the guide is a multilevel hierarchy of graphs, which reference the content and the rules of this content execution in the guide. The depth (recursion level) in the graph can vary.

Templates

Once the Story Graph/Guide Graph is created, Templates for the Guide/Guide Story retrieval are generated: set of the paths for the Guide retrieval depending on the request types. Templates allow to speed up the guide retrieval for particular use case: for example, if the person is interested in certain subject, like history, or nature; or need to retrieve the shortest or longest story.

Guide Retrieval & Execution

Guide Retrieval

1. Client makes a request to the guide service, providing the requirements for the guide. a. Guide subject: trip from A to B, "around my location", tour in the museum (like Expressionist Exhibition), local news, etc.; b. Geo parameters: location, route; c. User preferences: what user like (history, art), what is user type, behavior specific.

2. Based on the client inputs the method collects the source information (see Guide Content Raw Data Gathering section).

3. Then the method searches for the Guide Graphs fitting the request, or generates a new Guide Graph, if the one doesn't exist, along with the Guide Templates.

4. Then the appropriate Guide Template is identified/generated, and based on the template, the specific Guide for this particular client, preferences & context is created.

5. The Guide is then delivered to the client.

Guide Execution

The guide served for the execution in fact is the reduced/adjusted Guide Graph with the content (text, audio, video) attached. Based on the runtime environment and user inputs, the client executes the guide:

1. Performs analysis of the runtime situation: a. Previously executed Guide Nodes; b. Current location, moving speed; c. Expected tour duration; d. User runtime reaction (skip, fast forward, focus on specific themes) runtime learning.

2. Picks the Node/subgraph Node to execute following the Guide Graph based on the runtime situation analysis, such as:

a. How many Stories the guide would be able to cover while user is close to this location. (For example, if user moves fast, the guide would be able to tell about POI1 and POI2 while user is passing by, but if the user moves slow, then saying guide would be able to squeeze the stories of the other POIs);

i. Special Priority & Weight logic is used to decide, which Object Stories will be served: Parameters accounted to make the right prioritization:

1) Static (prior run-time): •POIs ratings from external sources; •Roadgazer Place Rating •Roadgazer User Historical Date ratings (machine learning on individual user behavior and user group clusters); •POI density in the area; •quality of the place data, defined by: data source (i.e. which APIs solutions, or crawled, or crowd-sourced, or professionally recorded), type (audio, video, text), amount (how much of the info, are there alternatives), content quality (parsing quality, etc.); •other factors can be potentially added.

Processed on Server. Every place gets a list of parameters above, and every parameter gets score S (score from 1 to 5) based on the data pre-processing and weight W (0-1)•empirical factor defined and turned during user trials. Places prioritized based on the value V=SUM(V1;Vn)/N=S*W, where Vn=Sn*Wn; •bigger V, higher the priority. After prioritization is finished, server returns the list of tops to the client (if saying client asked for the 20 places, then top twenty are returned).

2) Dynamic (run-time): distance to the POI from the route or current user location•user speed•user moving direction•history of the guide route for particular user (if user already listened to the guide on this route, need to pick something new).

Once client received a prioritized list of places from the server, it filters it and alters the priority based on the dynamic factors, before adding to the audio tour for the user, using same score—weight approach.

b. How detailed the Story about particular Object (POI) should be depends on the speed, user behavior and preferences (for example, if user likes history, talk longer in the historical section of the guide, but reduce sports).

c. If the user already read/heard/seen the story about the object already.

i. Special round robin method is used for the repeating routes/themes.

If the user is driving the same route multiple times, they do not want to listen to the same information. Instead, new (or forgotten) information shall be supplied. The guide does not repeat same info twice in a row.

Instead, the following logic is applied:

There is timeout T, if the user listened to the piece of information, it should not be played again during the next tour for time T (empirical value, to be tuned with the users, now set 1 month).

There the is a time stamp (TSi)—time, associated with the each place, when it was played last time There is a place priority, defining the places queue for particular location (Pi)

There a places queue available to be listen in current location Q—list, sorted according to the priorities P0>P1, and P0—the one to listen.

Simple logic: round robin with taking T into account

Active Place=Q[0];

Make the Q[1] the new head (shift the queue to the left)

Q[last]=Active Place;

This way we maintain the Priority sequence and push the already heard places to the end in case whole list is heard before t>T, queue will restart in the same order. But, if the original Q was not exhausted before t>T for some places i.e. not places in the list were heard by particular user, and timeout T expires for certain points (i.e. t current>=TSi+T), then the place with expired timeout is being inserted according its priority toward the start of the Queue.

Another logic—random places pick from the list.

3. Retrieves Node content and converts in appropriate format if needed:

a. Text to speech;

b. Audio from Video;

4. Serves the Node content to the user in text, or/and audio. or/and video format;

5. Retrieves the runtime situation changes and user input and goes to step 1.

Automatic Route Itinerary Creation and Adjustment

Automatic route itinerary creation and adjustment is performed the following way:

f) Information gathering: data about the objects to be included into itinerary is either manually loaded, obtained from the 3rd systems, crawled in the Internet, or crowdsourced.

g) Information processing: gathered objects data is processed, sorted, unified and formatted in a way to be used in the guide, and stored (optionally).

h) Figuring out the needs of the client: client requirements are obtained either by explicit user input, and/or by implicit learning about Client historical behavior and preferences, and learnings on the clustered client groups.

i) Itinerary creation: based on the requesting client requirements, the itinerary is machine created from the processed information.

j) Itinerary serving: itinerary is delivered to the client per client request and situation context, in a form of the route with stops, corresponding schedule and related descriptive information.

k) Itinerary adjustment: itinerary can be changed per user explicit action, or, when the system detects the event causing the itinerary change, for example, schedule delay, or user route change, or additional information reception by the system regarding the environment, route or user behavior.

The road trip travelers currently manually preplan their trips in advance, selecting places to visit, sites to see, food places to eat and rest/gas points to stop. Though, road trip travel is very different from the other types of travel, like by air or water, by its very dynamic nature. Road trip preplanning takes a lot of time, and, on practice, the plan doesn't work well when already on the road: schedule gets delayed, places closed, sudden passenger requests appear. Thus, it is essential to have a method and system, which would allow as fast and robust trip itinerary creation, so runtime adjustment of this itinerary on the go based on the changes in trip schedule and context.

Instead of making user spend time manually researching and selecting places/activities along their routes for the trip, the guide automatically picks the places and activities for the travelers based on the user preference, route and schedule, and historical learning of the user behavior and behavior of similar types of users, and construct the schedule/itinerary for the user taking into account route, time user expected to be at certain locations during their trip, and estimated time to spend at the locations.

Track how the user executes the trip and automatically correct/adjust itinerary in the case the actual situation/context/behavior does not match the predicted expectations, or if a new situation is discovered, suggest/take the appropriate actions on the trip adjustment.

The following steps are used for the automatic trip itinerary/plan creation, and adjustment:

1. Detecting the trip route, start date and time, and trip wishes (what user would like to do during the trip).

2. Using the gathered trip information, collect the place/activities data along the route (similar to gathering the data for the Guide in the previous section), process and select the places/activities could fit the trip.

3. Knowing the time/date of the trip, trip duration from the start to the end, distances to the places, create the itinerary adding certain places/activities to the route fitting the user expectations and calculating the schedule taking into account expected time to get to the places/activities, time to spend at the places/activities.

4. Once the itinerary is created, let the user review and correct the itinerary (adjustments would feed the trip creation logic learning based on the user behavior).

5. When user is executing the trip, the system tracks the actual behavior vs plan and suggests adjustments based on the observations, or acts upon the observations.

Itinerary Creation from the List of Selected POIs/Activities

Assume that the system collected the list of the places/activities along the user trip route, which could be interesting for the user (same way as the Guide does in the previous section). It is necessary to process this data and select only few to add to the user itinerary. The difficulty is to fit the user pace of the travel, expectations from the trip, and take into account time/distance to the places/activities, and how long it might take to visit them.

The following principles are used when adding the POIs/activities:

1. Duration of the trip (plan number of stop based on the duration) for example, if the trip is short, plan the stops around destination, if med-size plan several stops along the route; if long nonstop (like whole day drive) plan only few stops for rest and food, no long stops like museum visits.

2. Roundtrip same day, or not if roundtrip, need to account for the return time adding stops.

3. Time of the day the trip starts, and expected arrival time: if trip starts early in the morning, and allows time till the evening more places/activities can add to visit; if trip starts late afternoon the stops may be only rest and food.

4. Food time: estimated time to have breakfast, lunch, dinner, and snacks is used to add the food stops. Initially certain assumptions are made on food time, which is later adjusted upon user behavior (for example, usual lunch time is 12 pm-1 pm. Initially planning food stop around this time. But learning on user behavior if the user likes to have lunch around 2 pm, using this time to add the food stop for the further trips).

5. Nonstop drive duration: different people can drive nonstop for different duration: for example, families with kids typically stop every 2 hours for rest, families no kids every 4 hours, single adults every 6 hours (travel stats). So we make assumptions how often the user would want to stop during the trip based on the user type (family, kids, single) initially, and trip context, and then adjust this duration based upon learnings on actual user behavior.

6. Correlation of the stops: some people like to visit few places in one stop, some like to distribute. The Guide learns based on actual user behavior and take it into account when planning the trip.

7. Working hours of places/activities: the system checks the overlap between the activities/places working hours, and the trip schedule (expected time to arrive at the place/activity, and time needed to visit place/activity).

8. Time to spend at the certain place/activity: different places/activities require different visit time. For example, museum may easily take 2 h, while looking at the landmark only 15 min. Fast food need 15 min stop, while restaurant at least an hour. The system assumes time to spend for each place initially based on the place type (like museum, landmark, vista, etc.) and account for it in the trip schedule. Then we learn upon set of users behavior at the certain places (how long actually they spend there) and use this individually adjusted time to spend for the future trips.

Runtime Trip Itinerary Adjustments

When the user executes the trip, the systems tracks the actual user behavior vs the created trip itinerary, and when mismatch is detected, or unexpected new situation, flags the event suggesting certain actions:

1. When user is late and behind the schedule situation is detected, or user is ahead of time:
   a. System recalculates new expected arrival times to the places/activities and destination. If it detects, that any of those might be closed by the new arrival time, flags the message to the user and suggest to remove/automatically removes the stops.
   b. If the situation is detected that now some rest/food places are missing (like dinner place removed as it would be closed by arrival time), adds new places fitting new schedule.
2. When the user changes the route on the go:
   a. New route is recalculated.
   b. New route is analyzed if the old stops are still applicable. If not old stops removed, new stop added based on the new route.
3. When user skips the stops, or makes new, non-planned stops: type of the stop is checked (for the new stops either check by location/context or ask the user, what type of stop it is), and new stop of the type is suggested (if user skipped), or removed (if user added one already).
4. When the user asks explicitly for stops: for example, asks for food or rest in certain amount of time the system looks up for the corresponding place/activity, adds to the itinerary and recalculates the itinerary schedule (including the subsequences like now, with new stop, user is late for some other stop).
5. When the unexpected situation is detected: for example, user is tired, or driving nonstop too long, or moves very slow/fast the system activates the logic for the particular situation handling and acts upon it like suggesting rest, gas stops, or detours, etc.

Primary interface of interaction with the user is Voice. Application asks questions clarifying the user needs, recognizes the user answers (Voice Recognition), and takes appropriate actions: for example, reroutes to certain POI, provides more information about POI, recommends places to eat, etc.

Trip Route Setting and Navigation

User is able to set source and destination; application suggests route; application forward the route to 3rd party Navigation app (google maps, for example); user is using 3rd party navigation app for navigation; or application stays in the background and controls the route.

Trip Planning

Trip can be planned: preplanned, once user set source, destination, start date and time, and (optional) current Trip preferences (Trip Wishes); before the trip start, once user set destination (source location and start date/time defaults to current), and (optional) current Trip preferences (Trip Wishes); on the go, the app suggests addition/modification of POIs to stop, user can accept; on the go, user requests POIs stops modifications/addition, app does the modification.

Preplanned or right before trip start:

Once user set inputs for the route (destination, and optional source, date/time, Trip Wishes), application suggests the Trip, i.e. does Auto Trip planning for the user.

Auto Trip planning is done taking into account the following:

Trip Preferences; Trip Wishes i.e. what user is interested about in this trip (like kids attractions, or wine tour); User Preferences; or User Historical behavior.

Trip timing: App runs smart scheduling algorithm, taking into account time of the day, trip duration, POIs working time, expected user trip pace (number of stops, duration, etc.).

POIs relevance for this particular user.

POIs acceptance among the travellers population with similar profile as the user.

POIs relevance for this particular trip in terms of trip expectations, route and timing.

Once Auto Trip is suggested to the User, User can adjust it: selects (pins) the POI, and Route is adjusted to include the POI, or deselects (de-pins) and POI is removed from the route.

During the trip, application suggestions: application detects trip timing/schedule changes and suggests modifications to the route; and/or user feedbacks, if interested, then application adjusts the route and feeds new route to 3rd party navigation application.

During the trip, by user request: user can initiate request anytime during the trip addition/removal of POIs to stop; and/or once audio tour is provided, after information about POI is presented, user has the option to add POI to the route.

Points of Interest

POIs are of 4 categories: attractions (vistas, landmarks, museums, etc); food (restaurants, cafe, fast food, etc); gas stations (promoted with app partners); or hotels.

List of POIs is provided by the system backend, which takes it from: Google POIs API; Yelp; Trip Advisor; explicitly added POI by the system user; and explicitly added POI by the system admin.

POI's information is retrieved from the system backend, which takes it from: POIs source (Google POIs API, Yelp, Trip Advisor); Wikipedia material for Audio Guide; Flickr pictures; Travel Magazines database; or information (description, reviews, ratings) provided by the system user/admin.

When application suggests the POIs, it is based on: trip schedule/timing (example: suggest places to eat in the places user expected to be at lunch/dinner time); learnings from the user's behavior (example: if before the user picked Mexican restaurants to eat more often, the system suggests more Mexican restaurants); user preferences that is explicitly input into the application (example: user selected in the preferences that user likes Chinese restaurants and Mexican restaurants, so the application will suggest to the user these types of places to eat primarily); user history (example: if user travels the same route again, the system does not recommend the POIs the user recently visited); or POIs ratings and reviews (example: recommend most highly rated places first).

Number of POIs to choose from is limited to a reasonable amount, so user is not drowned in tons of options. User can also search for a specific POI and add it to the route.

Audio Guide

During the trip a user is presented with the option to listen for audio guide.

Guide topics are driven by the POIs (attractions) user is passing by during the trip or current user location.

Guide is created dynamically during the user way: user's route is analyzed; POIs (attractions) are retrieved along the user's route by ratings, historical and cultural meaning, and reasonable distance from each other to fit the duration needed to listen about each POI in the guide; POIs description information is retrieved (as text); text is converted to audio using text-to-speech; and audio is played back when user is passing by related POI.

Guide content (POI description) is received from: Wikipedia descriptions of POI; Travel magazines databases; or system user/admin provided text.

Audio is created by text-to-speech operations using Google text to speech other text to speech engines.

User can start the guide, pause the guide, stop the guide and rewind: manually from the notification curtain/lock screen, when the app is in the background; from the application screen; or by voice.

User is given the option to listen about POI as well when manually selecting POI card from the list and tapping "audio playback" button.

Voice Interface

The primary way of interaction by the user with the application during the trip is by Voice.

Voice interface includes: speaking to the user and voice Recognition of the user's inputs.

Voice interaction is not free-form, but build on IVR (Interactive Voice Response) principles. This increases voice recognition rate and, correspondingly, voice reliability. The application asks user the questions, and gives predefined answers variants. User responds by voice, the response is recognized and mapped to one of the expected answers. Corresponding action is taken by the application. Example: application says: "In five minutes we will be passing by the turn to Santa Barbara mission. Do you want to make a stop there? Say Yes or No." User says: "Yes". The application says: "Response 'yes' received. Rerouting."

Application will prompt user with the voice requests, in appropriate situations.

User will be able to invoke voice interface during the trip by prompting with the key voice launch phrase. The application in the background will stay listening for the key phrase, such as "hey Roadgazer", etc.

User Registration

User registration will be done by promoting 3rd party logins. Main application functions will be available without user login. Only for advanced usage registration will be required. Minimum data required will include: approval of terms and conditions; name; and email. There is also provision for a user profile which may include: picture, social IDs, and user preferences. The user profile also has provision for a user trip history and links to user-created POIs.

Sharing and Posting to Social Media

The user is able to make post about POI he or she liked to social media. The user must be able to share his or her trip to social media.

Review and Rating

The user is able to review and rate specific POI. The user is able to preview the POI rating and read POI reviews. Ratings and reviews of POIs are retrieved to display.

Adding New POIs

The addition of new POI is a feature of the application. User is able to add new POIs to the system's POI database. Each new POI request should have: POI name, POI location (location is based on the central point of the POI, i.e., the most central point relating to the particular POI), POI picture, POI category (from a list of POI categories), and a POI description.

FIG. 1 is a high level view of guide creation. Information on a point of interest (POI) is gathered from multiple sources such as $3^{rd}$ party places application program interfaces (APIs) S11A, from publicly accessible websites S11B and news sites S11C, along with information input by the user S11D, and databases (DBs) internal to the guide creation system S11E. Current examples of current $3^{rd}$ party place APIs include ones belonging to Google, Foursquare, and Yelp. A current example of a publicly accessible includes Wikipedia.

The information gathered from S11A-E goes through an aggregator micro service S12. The aggregator micro service S12 collects the related data and passes it through to the object processor S13. The object processor S13 gathers the information for the POI and begins parsing the information to create a guide. Nodes are individual images, bodies of text, information, sentences, and paragraphs related to an individual POI and form the object stored in the objects database (DB) S15 with keyword story indexing S14 for quicker retrieval and formation of a tour guide. Keyword story indexing S14 provides prioritization and hierarchical information for how the individual nodes of information should be presented in a tour guide. Using both the keyword story indexing S14 and the objects DB S15 a story graph with nodes S16 is formed. The keyword story indexing S14 is used to an elastic search of the indexed story DB S17. By elastic it is meant that the search is flexible and the resulting story graphs S18 for an individual POI are also flexible. The elasticity of the search is required in order to tailor the tour guide to the individual user's location, speed, and direction of movement.

Rather than providing a static pre-recorded tour guide where the information is meted out at a set pace the present invention seeks to create a dynamic tour guide providing varying levels of depth and length of information to be provided regarding an individual POI or series of POIs based upon parameters including the individual user's location, speed, and direction of movement. The present invention therefore works as a dynamic tour guide that works if the user is traveling by foot, bike, car, train, or other means of transportation. And because speed of the user is taken into about the information conveyed by the tour guide can be increased or decreased based upon the predicted and measured amount of time that the user is within the vicinity of the object. Essentially the invention uses a combination of high powered server computing and the breadth of information available on the internet and storable in an internal database to provide the user a customized tour guide tailored to their interest and the amount of time they are within the vicinity of a point of interest.

Figure 2:
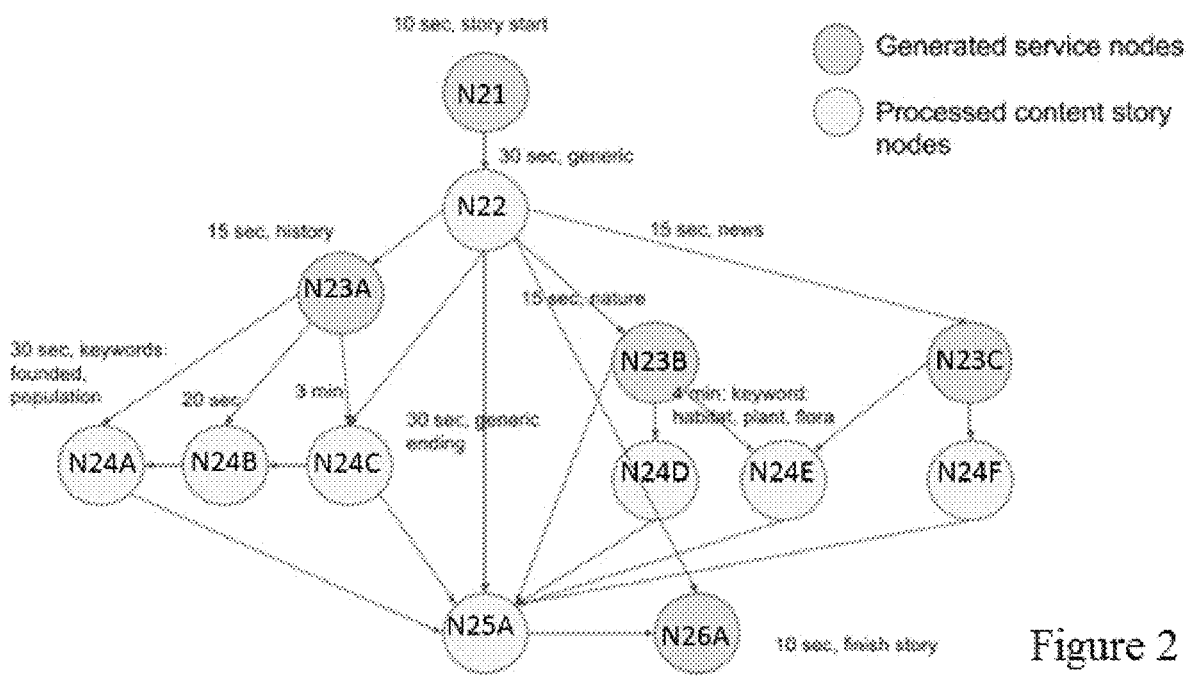
FIG. 2 shows multiple paths of formation of a single example story graph according to the present invention.

FIG. 2 shows multiple paths of formation of a single example story graph. In this example node N21 is a 10 second start of the story about the POI. Node N22 is a 30 second generic information section of the story of the POI. At nodes N23A, N23B, and N23C there is a first branching of the story of the POI. Node N23A contains historical information about the POI. From node N23 the story of the POI can continue to any one of nodes N24A-C or any combination of those nodes each including additional historical information about the POI. From the path chosen through nodes N24A-C leads to node N25A which contains a generic ending which finally leads to N26A the finish of the story about the POI. Alternatively the story can follow a path from node N22 to node N25A and contain only generic information about the POI and a generic ending of the story. An alternative path can be followed from node N22 through N23B and then N24D or N24E to N25A providing generic information about the POI, information regarding nature surrounding or at the POI and additional information regarding the habitat, plants, or flora and then to the generic ending finishing the story. And yet another alternative path goes from N22 to N23C to N24F or N24E and to N25A focusing on news and recent stories about the POI.

The story graph allows for multiple paths between nodes of information to be conveyed to the user. This means that the story told about a POI can be tailored to a user's preferences; if a user prefers historical information the story can follow a historical path, the same being true if the user prefers nature or new/current events information. Furthermore the length and amount of information conveyed to the user, contained in a given path through the story graph, can vary based upon movement speed and direction of the electronic device of the user. If the movement speed is low a longer story graph path containing more information is taken. If the movement speed is high then a shorter path containing less information is taken. And, additionally, the system tracks which paths of a story guide have been taken so that on subsequent visits to the same POI then at least some different information is conveyed to the user about the POI. For example, if on a first visit historical information was provided then on a second visit news or nature information is provided instead.

The Story Graph for each object to be included into the Tour Guide is created based on the obtained data from the multiple sources. Story Graph structured as nodes, the nodes connected together forming the story graph, with single or multiple paths between nodes, and when any path is followed, the connected story about the object can be retrieved. Pieces of text information, and/or audio and/or video information connected together in such a way that following the connections from start to any end of the graph, the user can read, hear, and/or see logically and semantically connected story.

Generated service nodes are the nodes containing the information produced by the system. Generated service nodes include connection phrases like: "And now we will talk about the history of the city" or "This is the end of the story". Processed content story nodes contain the information gathered from public sources but is pre-processed and structured by the system. These contain the sentences, paragraphs, images, video, and other information gathered and collated to be the elements of the Story Graph.

Figure 3:
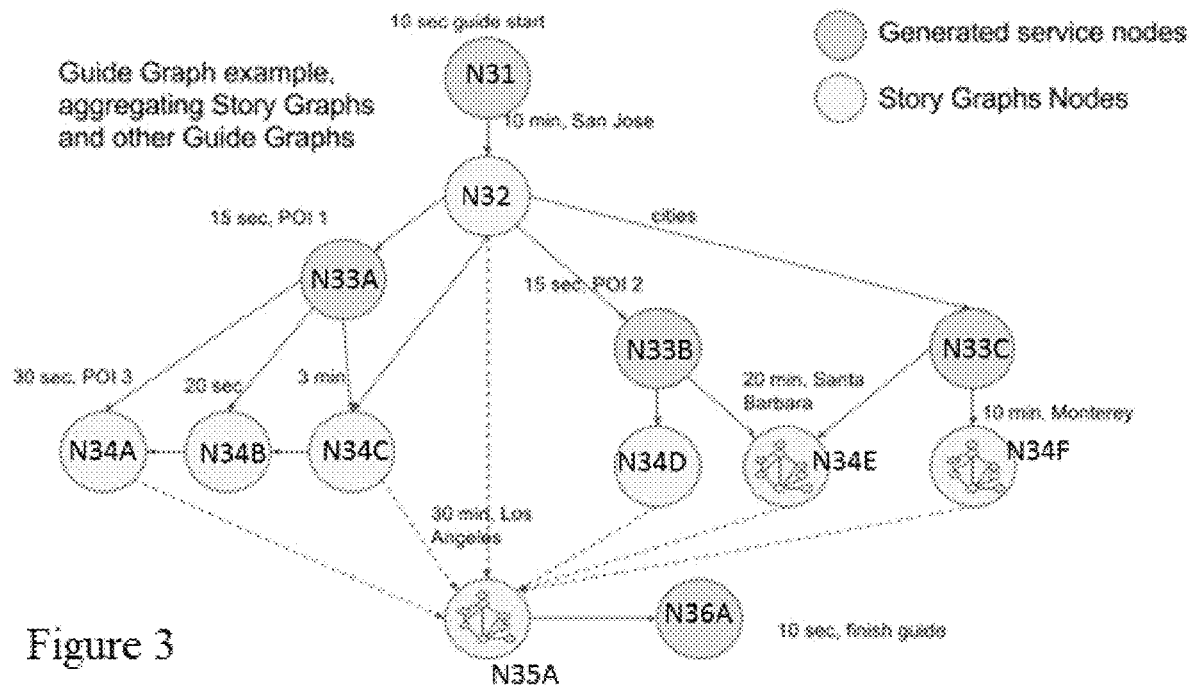
FIG. 3 shows a Guide Graph according to the present invention.

FIG. 3 shows a Guide Graph. The guide graph determines what information is conveyed to the over the entire duration of the tour guide. The particular example is for a road trip from San Jose, Calif. to Los Angeles, Calif. Similar to the Story Graph of FIG. 2 there are different paths, and therefore different information for the Guide that is presented to the user.

The Guide starts at node N31 then proceeds to N32 conveying information regarding the start city of San Jose. From node N32 one of four paths, in this example, are selected. The shortest path just has information conveyed when nearing Los Angeles, Calif. contained in node N35. A node in the Guide and in a Guide Graph may contain either a single fact or piece of information as would be found in one of the nodes of the Story Graph or the node in a Guide Graph contains an entire Story Graph comprised of its own nodes.

Longer Guides involving more combinations through N31, N32, N33A, any combination of N34A-C, N35A and N36A. Each of N33A and N34A-C each contain their own information, whether single parcel of information or an entire Story Graph for an individual POI. In this example node N33A contains the information for POI 1 and N34A the information for POI 3 and so on.

Alternatively another path through the Guide Graph may be chosen involving POI2 in N33B and additional information in node N34D or information about Santa Barbara, Calif. in N34E. And another alternative path through the Guide Graph going through nodes N33C and N34F, where N34F contains a Story Graph for the city of Monterey, Calif.

Which path is taken through the Guide Graph, and thereby the content of the Guide, is determined by multiple factors. In the present example it depends on what route between San Jose, Calif. and Los Angeles, Calif. the user has selected. Along that route the user selects between multiple suggested POIs. The suggested POIs are selected by the system. The user selects from the suggested POIs to become part of their Guide. Some of the POIs have their own Story Graphs and the path through that Story Graph is selected based upon the factors for path selection outlined above.

The POIs included in the Guide are selected automatically when the user elects to use the application in automatic mode. In automatic mode the system selects which POIs to present based upon availability along the route, expressed user preference, and which POIs had previously been presented in order to create dynamic guides.

Figure 4:
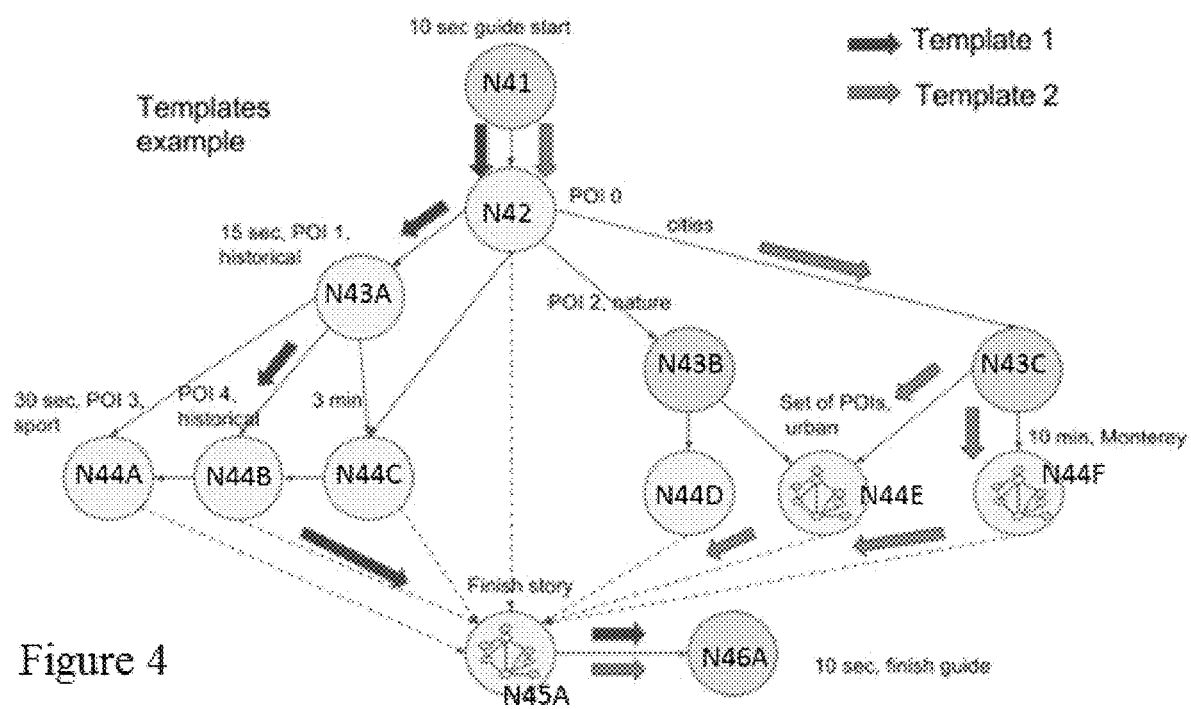
FIG. 4 shows how the electronic device performs path selection within a Guide Graph.

FIG. 4 shows how the electronic device performs path selection within a Guide Graph. The resulting Guide is an aggregation of all the information about the POI or set of POIs. The system delivers to the user only specific parts of the Guide Graph based on user preferences, time available, usage history, etc. To select these parts quickly templates could be used. Instead of selecting individual POIs the user desires to be delivered the user could select from preselected templates, in FIG. 4 being Template 1 and Template 2. This allows the user to quickly select between two different Guides to be presented to the user.

Figure 5:
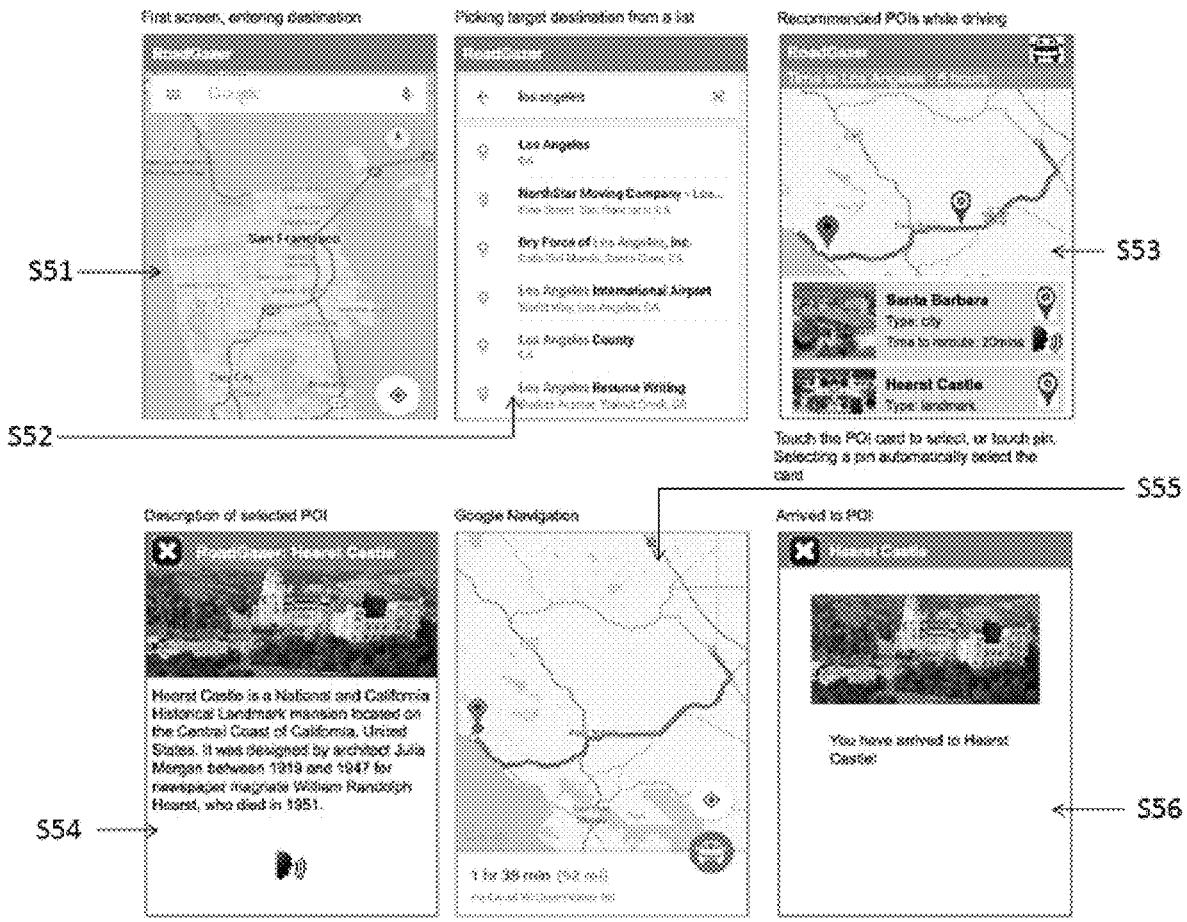
FIG. 5 shows part of the method of the present invention being implemented as a tour guide application on an electronic device.

FIG. 5 shows part of the method being implemented as a tour guide application on an electronic device. First a user enters a destination S51. The application generates a list of possible destinations S52 based upon the destination input by the user in step S52. Once a destination is selected by user an overview map of the route is provided along with a scrollable list of points of interest along the route S53. Once a user selects a point of interest from the list S53 a POI page is provided with a brief description of the POI, images and video may be provided, as well as an audio button provided to allow the description of the POI to be read to the user S54. S55 shows a navigation pane. S56 is a notification page for when the POI is arrived at and may contain text and images.

Figure 6:
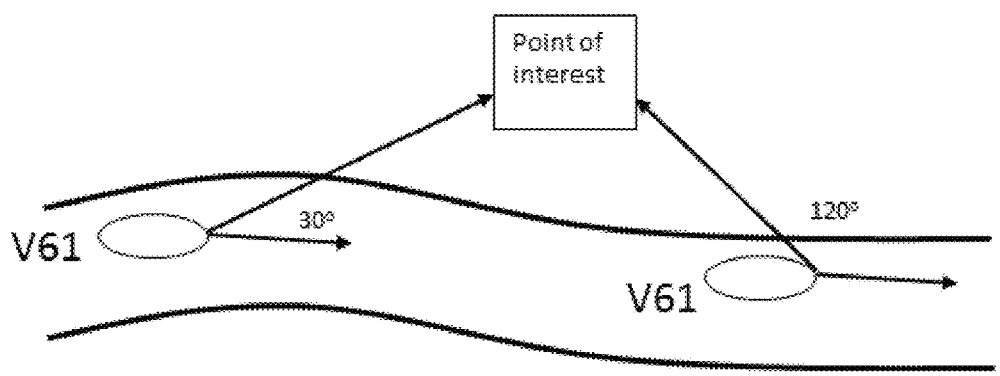
FIG. 6 demonstrates one manner in which the overall time to convey information conveyed in a story graph is determined according to the present invention.

FIG. 6 demonstrates one manner in which the overall time to convey information conveyed in a story graph is determine. The system uses the speed and direction of the electronic device and determines when the POI (i.e. the central point of the POI) is within a 30° angle, according to the user's direction of travel, of the POI. This value correlates to T1. Then, based on the same metrics, when the POI is at a 120° angle according to the user's direction of travel, T2 is calculated. The angle between the user's direction of travel relative to a central (i.e. center point of a) POI location may be determined using, e.g., a device compass (e.g., compasses in mobile devices, compasses in cars), alternative device location detection systems, and/or mapping software information which map the POI and device coordinates on a common coordinate system. Known mathematical formulas for the calculation of an angle formed (1) by two lines, (2) between two lines, and/or (3) between two points, may be used. The time M for the information in the Story Graph to be conveyed is calculated as the difference between the estimated T2 and T1. With time M being determined based on the movement of the user, this M value limits which path through a Story Graph may be taken for any given set of POIs. The time M can be actively updated and more information may be conveyed if the speed or direction of the user/electronic device deviates significantly from the estimated calculated value M. Therefore, while the user is between an angle of 30-120 degrees relative to the user's direction of travel, the value M is continuously and automatically being estimated, such that the user may be provided with the most relevant descriptions based on the user's location relative to the POI.

Figure 7:
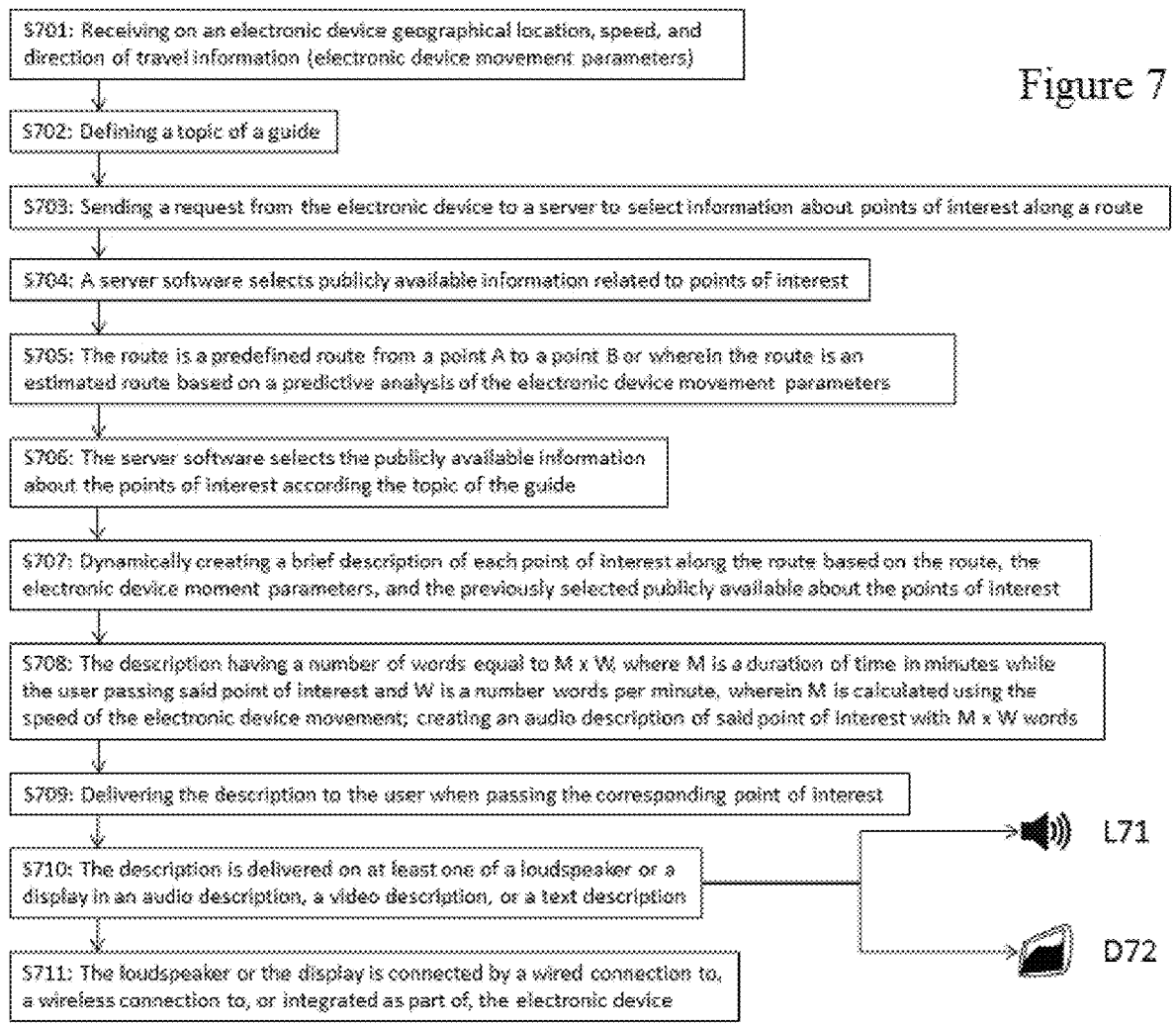
FIG. 7 is a flow chart of the present method of creating and delivering a dynamic customized tour guide to a user according to the present invention.

FIG. 7 is a flow chart of the present method of creating and delivering a dynamic customized tour guide to a user. The steps of the method are as follows. S701: Receiving on an electronic device an information about a geographical location of the electronic device for creating the guide; the electronic device having a system for determining geographical location; the geographical location being an arbitrary location in any place on Earth. Further receiving an information of a speed and a direction of an electronic device movement. The geographical location of the electronic device, the speed of the electronic device, and the direction of the electronic device define electronic device movement parameters. S702: Defining a topic of the guide. S703: Sending request from the electronic device to a server to select information about points of interest along a route. S704: A server software selects publicly available information related to points of interest. S705: the route is a predefined route from a point A to a point B or wherein the route is an estimated route based on a predictive analysis of the electronic device movement parameters. S706: The server software selects the publicly available information about the points of interest according the topic of the guide. S707: Dynamically creating a brief description of each point of interest along the route based on the route, the electronic device moment parameters, and the previously selected publicly available about the points of interest. S708: The description having a number of words equal to M×W, where M is a duration of time in minutes while the user passing said point of interest and W is a number words per minute, wherein M is calculated using the speed of the electronic device movement; creating an audio description of said point of interest with M×W words. S709: Delivering the description to the user when passing ("passing," as used herein, is defined as a calculated position by the present invention of the user, the calculated position of the user being relative to the center of the POI, the calculated position equating to when the difference between the coordinates of a user device location and the coordinates of the POI location, on the map, is zero) the corresponding point of interest. If the user's device does not pass the center of the POI, the present invention takes the lowest value obtained to infer that the user has passed the central point of the POI and therefore is moving, or at least beginning to move, away from the POI. Such a determination may be made, e.g., via any graphical software which begins to show a trough-like graph. It is noted that several currently known methods exist for such determination. S701: The description, which may be based on the calculated value, is delivered on at least one of a loudspeaker or a display in an audio description, a video description, or a text description. S711: The loudspeaker L71 or the display D72 is connected by a wired connection to, a wireless connection to, or integrated as part of, the electronic device.

In a preferred method of practicing the invention the information about the geographical location in step S701 is a current user location received from a GPS inside the electronic device.

In a preferred method of practicing the invention the defined topics of the guide in S702 include architecture, history, nature, or current events.

In a preferred method of practicing the invention in step S708 the words per minute used to convey information W is 150.

In a preferred method of practicing the invention starting the delivering of the audio description of step S709 when the user is 100 meters from the point of interest. The distance of the user to the point of interest may be calculated, e.g., via the following formula and assuming the ser's coordinates on the map, U=(Xu; Yu), and the POI coordinates on the map, POI=(Xpoi; Ypoi); the distance between two locations, D= $\sqrt{(Xpoi-Xu)^2+(Ypoi-Yu)^2}$; it is noted that currently known online maps are able to provide this distance between 2 points themselves. Therefore the above is merely an example.

In a preferred method of practicing the invention the information storage is a server containing pre-selected data about each of the points of interest In a preferred method of practicing the invention the pre-selected data has nodes that are standalone pieces of comprehensive content that can be delivered as a sentence or paragraph and wherein the pre-selected data has edges that are connections between the nodes and represent the order, sequence, and priority of individual pieces of information for the brief description to be dynamically generated from (FIGS. 1-4).

In a preferred method of practicing the invention the preplanned route of S705 has at least a start point A and at least a selected end point B and is determined by the first user using a third party navigation application which determines the preplanned route.

In a preferred method of practicing the invention the route in S705 may be nearly instantly calculated using third-party maps & navigation software, e.g., Google Maps, and based on the electronic device's movement parameters, which may be sent to and combined in a processor of the present invention.

In a preferred method of practicing the invention the publicly available information of S704 includes websites, publicly available application interfaces (APIs) and information previously stored on the server. In a preferred method of practicing the invention the publicly available information of S704 includes data in text, photo, audio and video formats.

The system and method while described from the perspective of a single user works on a large scale with many individually customized travel guide for a multitude of individual users having a different location and moving in a different direction. The speed at which guides are created and the number of simultaneous user guide creation requests that can simultaneously be processed is hardware limited. The system and method is scalable and is limited in number of individual guides being created by the host hardware for its implementation. Host hardware includes central processing units (CPUs), random access memory (RAM), non-transitory computer readable mediums (hard drive disks [HDDs], solid state drives [SSDs]), and the electronic devices of the users which include smartphones, tablets, smart glasses, and vehicle infotainment systems.

In a preferred method of practicing the invention the server simultaneously supports at least one thousand individually customized travel guides for at least one thousand individual users, each of the one thousand different users having separate and distinct electronic device movement parameters.

In a preferred method of practicing the invention the brief description of S707 for each POI is at least 30 seconds. In a preferred method of practicing the invention the brief description of S707 for each POI is at least 10 seconds.

In a preferred method of practicing the invention creating the brief description in S707 of each point of interest is less than 1 sec.

In a preferred method of practicing the invention creating the brief description in S707 of each point of interest is less than 30 sec.

In a preferred method of practicing the invention the point of interest in S703 is a city, a site of historic significance, a restaurant, a place of lodging, a museum, a geographical area, or other waypoint along the route.

In a preferred method of practicing the invention the description in S708 is smaller than or equal to a total information about each point of interest that the server has.

The logic of the method of the present invention is as follows:

Step 1. Publicly available information is collected about POI(s). There can be multiple sources of information, multiple POIs-related texts, etc. This information can be either collected and stored on the server in advance, or the client can do it (though not as efficiently).

Step 2. When the device with its dynamic parameters (movement parameters, duration, user preferences, etc.) comes into the picture, (a) the information collected about POIs is converted into a comprehensive story about the POI itself, taking into account said device's dynamic parameters; (b) the set of "comprehensive stories" about POIs is converted into the connected guide being delivered to the user, again based on the device's dynamic parameters. Technically, the server may send the whole set of information about POIs along the route to the device, and client device does the rest to create a connected guide; however, the server may do some (if not all) processing of the information for the client, and in this case the client will receive the guide in pieces. Noting that the client behavior can change in a very dynamic way (speed, direction, changing routes), the server may provide the client with full processing of the raw information about a POI. If not, the server performs some processing of the raw information and delivers it in a shape such that it makes the work for creating a final guide much easier. For example:

The server obtains the information about POIs from different sources, and creates a POI "story graph." The story graph comprises nodes containing pieces of the information regarding the POI which can be independently delivered to the user (for example, paragraphs, or sentences, or small stories), and edges representing how the nodes can be connected into the "comprehensive story" for the user. Building nodes from the raw info, and connecting them into the story graph is performed using natural language understanding technologies. The story graph is a static entity, i.e., it is independent from a specific device or users, allowing for creation of an exact "comprehensive story" about a POI very fast based on the user dynamics and preferences. When the device with its dynamic parameters (movement params, duration, user preferences, etc.) comes into a range of a POI, said above comprehensive story about the POI is created from this static graph based on the device dynamic parameters. As mentioned above, the POI comprehensive story can be created on the server (where the device provides its parameters and gets back "comprehensive story" about POI ready to be delivered), or alternatively on the client (where the server just sends the story graph for the POIs to the device).

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

What is claimed is:

1. A method of creating and delivering a customized travel guide for a user, wherein said guide corresponds to a route taken by the user, comprising:
   receiving, on an electronic device, information about a geographical location of the electronic device on which the customized travel guide is created, the geographical location of the electronic device being any location,
   receiving, on the electronic device, information of a speed of the user and a travel direction of the user, said information of the user's speed and direction being based on movement of the electronic device, wherein the geographical location of the electronic device, the speed of the electronic device, and the travel direction of the electronic device define electronic device movement parameters,
   the user defining a topic of the guide, said topic including architecture, history, nature, or current events relating to one or more points of interest (POIs) along the route taken by the user,
   sending a request, from the electronic device to a server, for information about said one or more points of interest along the route taken by the user,
   a software of the server selecting publicly available information related to the one or more POIs according to the defined topic of the guide, said server transmitting the selected publicly available information related to the one or more POIs to the electronic device, wherein the route taken by the user is estimated by the server software to create a predefined route from a point A to a point B, wherein the route taken by the user is an estimated route based on a predictive analysis of the electronic device movement parameters,
   creating, on the electronic device, a description for each of the one or more POIs along the route taken by the user, each said description being created based on the route taken by the user, the electronic device movement parameters, and the selected publicly available information about the one or more POIs,
   wherein each description of each of the one or more POIs comprises a number of words equal to M×W, wherein M is a duration of time in minutes during which said user is passing by each of the one or more POIs, wherein W is a number of words per minute,
   calculating input values for M and W, the input value for M being correlated to a device location and a device moving speed, the input value for W being determined by explicit user input, and
   delivering, via the electronic device, a description of each of the one or more POIs to the user for the duration of time, M.

2. The method of claim 1, wherein the information about the geographical location is the user's current location received from a GPS inside the electronic device.

3. The method of claim 1, wherein W is 150.

4. The method of claim 1, further comprising starting the delivering of the description when the user is 100 meters from each of the one or more POIs.

5. The method of claim 1, wherein the selected publicly available information has nodes that are standalone pieces of content that can be delivered as a sentence or paragraph, and edges that are connections between the nodes, the edges representing an order, sequence, and priority of individual pieces of information for the description to be generated.

6. The method of claim 1, wherein the route is determined by a third party navigation application.

7. The method of claim 1, wherein the estimated route is instantly calculated based on the electronic device movement parameters.

8. The method of claim 1, wherein the selected publicly available information includes websites, publicly available application interfaces (APIs), and information previously stored on the server.

9. The method of claim 1, wherein the selected publicly available information includes text, photo, audio, and video data.

10. The method of claim 1, the server further comprising a plurality of individually customized travel guides for a plurality of individual users having a different location and moving in a different direction.

11. The method of claim 1, wherein the server simultaneously supports at least one thousand individually customized travel guides for at least one thousand individual users, each of the one thousand individual users having separate and distinct electronic device movement parameters.

12. The method of claim 1, wherein creating the description of each point of interest does not exceed 1 second.

13. The method of claim 1, wherein creating the description of each of the one or more points of interest does not exceed 30 seconds.

14. The method of claim 1, wherein each of the one or more points of interest is a city, a site of historic significance, a restaurant, a place of lodging, a museum, or a geographical area.

15. The method of claim 1, wherein the description is smaller than or equal to a total information about each of the one or more points of interest that the server has.

16. The method of claim 1, wherein the server further detects when the electronic device is located within a threshold distance of a central point of each of the one or more POIs, said further detection forming a value used to further estimate M.

17. The method of claim 1, wherein the speaker or the display is connected by a wired connection to, a wireless connection to, or integrated as part of the electronic device.

18. The method of claim 1, wherein the description is delivered on at least one of a speaker or a display.

* * * * *